(12) United States Patent
Toyooka

(10) Patent No.: US 6,572,316 B2
(45) Date of Patent: Jun. 3, 2003

(54) SCREW WITH THIN HEAD

(76) Inventor: Toshimasa Toyooka, 20 Umegahata Inokura, Ayabe Kyoto 623-0054 (JP)

(*) Notice: Subject to any disclaimer, the term of this patent is extended or adjusted under 35 U.S.C. 154(b) by 0 days.

(21) Appl. No.: 09/795,945

(22) Filed: Feb. 26, 2001

(65) Prior Publication Data

US 2002/0051694 A1 May 2, 2002

(30) Foreign Application Priority Data

Oct. 31, 2000 (JP) ........................................ 2000-333485

(51) Int. Cl.[7] .......................... F16B 23/00; F16B 35/06
(52) U.S. Cl. .................... 411/399; 411/404; 411/424; 411/919
(58) Field of Search ........................... 411/399, 402, 411/403, 404, 919, 411, 424

(56) References Cited

U.S. PATENT DOCUMENTS 5,516,248 A * 5/1996 DeHaitre ................. 411/399 X
5,778,623 A * 7/1998 Powell ..................... 411/399 X
5,890,860 A * 4/1999 Dorris ......................... 411/404
5,964,560 A * 10/1999 Henriksen ............... 411/404 X

* cited by examiner

Primary Examiner—Neill Wilson

(57) ABSTRACT

A screw with a thin head comprising a screw head (2) and a shank (4), and with its top (5) forming a circular arc of a large radius has an unthreaded part (20) tapered down between the bearing surface (6) and the thread (3) and has a radius (21) connected to the thread portion (3), and therefore it will be readily produced to be used for compact products and correspond with thin products. And the radius (21) is connected to the unthreaded part (20) of the shank on one hand and to the screw ridge (3) on the other, preventing stress concentration at this part from occurring at time of fastening and a long time after the fastening of the screw, so ensuring a fastening strength, without causing a fatigue fracture. And further, when heating and plating treatments have been given to the screw, as the top of the screw head is not flat, there is no possibility of the heads of the screws being stacked to each other in the course of mass production, ensuring stable heat and plating treatments.

1 Claim, 4 Drawing Sheets

SCREW WITH THIN HEAD

BACKGROUND OF THE INVENTION (1) Field of the Invention

This invention relates to a screw with a thin head which does not uglify a work piece even though the screw head juts from the work piece when it has been screwed into the work piece, and can work piece without causing any problem with its fastening function.

(2) Description of the Related Art

Recently, electric appliances and intelligence apparatus have been improved in performance and comparatively small-sized ones have been used. Especially, thin electronic apparatus such as electronic pocketbooks, notebook-sized personal computers, and handy phones have been rapidly widespread because of their portability. These apparatus must be as light in weight as possible and be thin to ensure their carryability. As a natural result, small screws whose major diameters of external threads are 2 mm or less have been used to assemble such apparatus. Therefore, smaller screws have been developed in recent years.

Besides, the screws have been in demand with thinner heads in recent years. This type of screws are invented and then announced as Utility Model No. 38-10834 in 1963 as shown in FIG. 7. This screw consists of the round head (302) and the main rod (304) with which the round head is integrated. The plain rim (305) is formed around the round head (302); the cross-shaped recess (310) is formed in the round head (302) to fit with a driver; the conic part (not shown in the drawing) is formed at the end of the main rod (304); and the ridge of the same pitch (303) continuously run through the main rod (304) and the conic part. This screw was originally designed not to assemble comparatively thin apparatus, but to integrate a screw head with a washer. The screw was far from the user's demand in assembling thin apparatus because the whole head was still large. And also in this type of screws an edge is formed between the unthreaded part and the thread portion, because there is an unthreaded part between the head and the thread portion and the thread portion is directly connected to the unthreaded part. The stress concentration at the edge may cause rupture of the screw at time of fastening it and easily lead to a fatigue fracture of the screw due to fatigue building in the edge with time. The flowability of material cannot be attained when a screw head is cast, because the gradient of the tapered unthreaded part is not larger than the gradient of the external wall of cross-shaped recess. Therefore, there is a problem that the life-spans of a punch and a holder used to form screws are short.

SUMMARY OF THE INVENTION

Although thin apparatus is in demand, screws compliant with such downsized apparatus have not been developed yet, because screws have a limitation in downsizing. There is a concern that this limitation will wield a very large influence over assemblies of downsized apparatus in the future. To dispel the concern, a screw with a head thinner than those of conventional screws whose major diameter of external threads are just designed to be small has been developed and experimentally used. In heading a screw with a thin head, the slot fitting with a driver bit reaches the shank, and therefore the material around the slot becomes thin and liable to be broken, not ensure the sufficient strength and function of the screw. When a screw is heat treated and plated to be strengthened, the screw heads come into contact with others during the processing in the course of mass production because the volumes of the flat heads are small, causing an incompleteness of a heat treatment and plating.

In keeping with the principles of the present invention, the object of this invention is accomplished by a unique structure comprising a screw head (2) in which a recess (10) coinciding with a driver bit that transfers driving force is formed and a shank (4) which is integrated with and a thread portion (3) is formed on, featuring a circular arc of a comparatively large radius formed on the head top (5); an unthreaded part (20) with larger diameter at a bottom of the head and smaller diameter at an upper end of the thread; which is tapered down between a bearing surface (6) and the threaded portion (3) of the shank (4); a radius (21) with a curved surface at a sectional view along almost one pitch of thread, which is formed at an end of the unthreaded part (20) of the shank in such a way as to be directly connected to the thread portion (3) preventing stress concentration from occurring herein at and after the fastening of the screw.

BRIEF DESCRIPTION OF THE DRAWING

These and other objects, advantages and features of the invention will become apparent from the following description thereof taken in conjunction with the accompanying drawings, which illustrate a specific embodiment of the invention. In the drawings.

DESCRIPTION OF THE PREFERRED EMBODIMENTS

Figure 1:
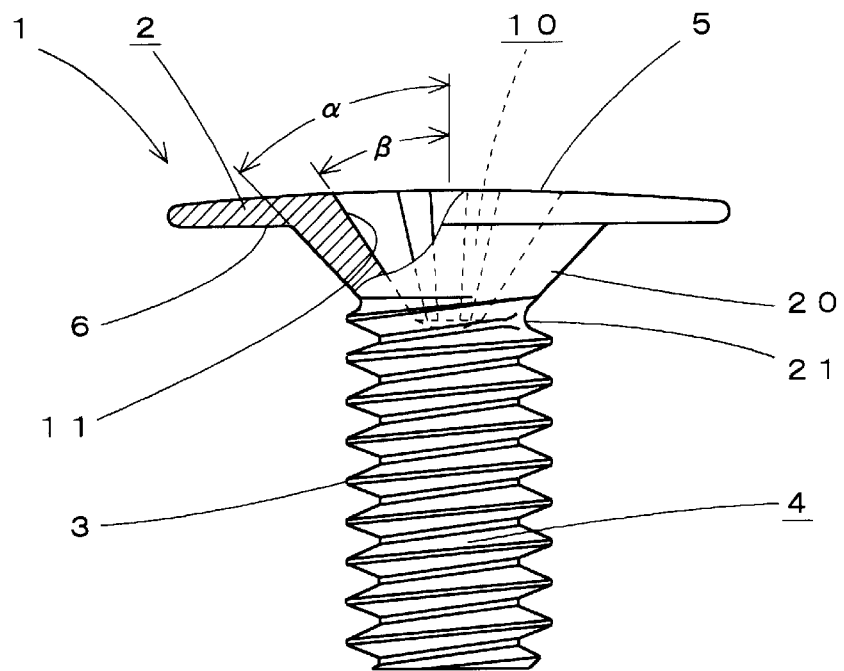
FIG. 1 shows a Sectional View of a Screw with a Thin Head Describing a Preferred Embodiment.
Figure 2:
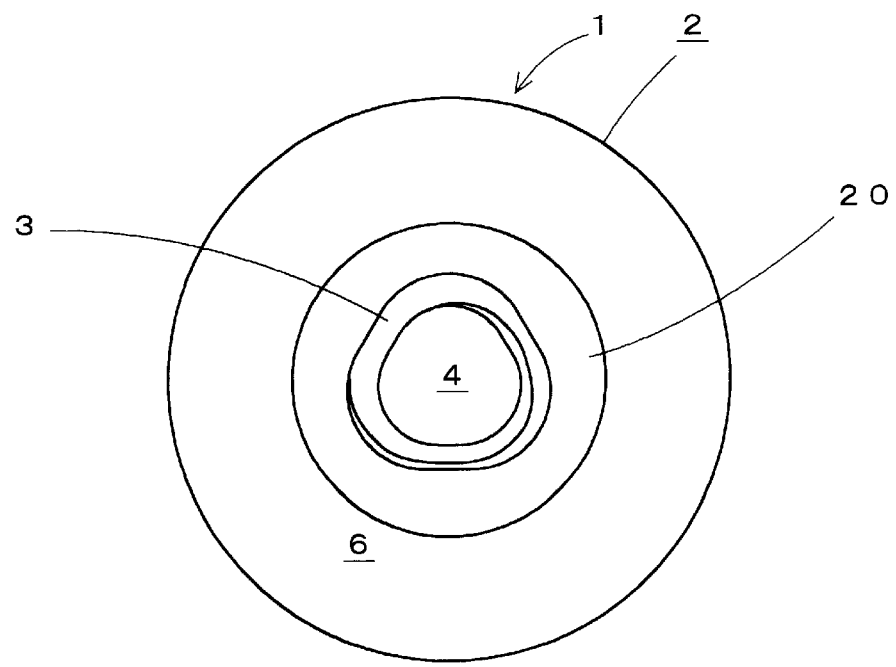
FIG. 2 shows a Bottom View of FIG. 1.

The detailed description of the preferred embodiments is provided based on FIGS. 1 to 6. In FIGS. 1 and 2, (1) is the screw comprising a screw head (2) and a shank (4) which the head (2) is integrated with and a thread portion (3) is formed on. At the head (2) of (1), the conical cross-shaped recess (10) coinciding with a driver bit (not shown in the drawing) that transfers driving force is formed on the central line of the shank (4), reaching the shank (4). The external wall (11) of the recess (10) between the top (5) of the head (2) and the shank (4) is inclined toward the center of the shank (4). The thickness of the head (2) is made relatively thinner than those of heads of conventional screws. The maximum thickness of the head (2) before the recess (10) is formed in it is set to be not more than one-third of the major diameter of external thread. The top (5) of the head (2) is a circular arc of a comparatively large.

Radius, and the circumferential part of the head (2) is thinner than the center part in thickness. The outer diameter of the head (2) is made 2.5 to 3 times larger than the major diameter of external thread of the screw (1). The dimension of 3 times as large as the major diameter of external thread is a limit size of the outer diameter for a head to be headed without producing defective pieces such as a chipped or broken ones because of a less flowability of material for a screw. Therefore the outer diameter of the head is set, at the maximum, to be not more than 3 times the major diameter of the external thread.

As shown in FIG. 1, part of the shank in proximity to the bearing surface (6) of the head (1), i.e., unthreaded part (20) of the shank between the bearing surface (6) of the head (2) and the threaded part (3) of the shank (4) is tapered down with larger diameter at the bottom of the head and smaller diameter at the upper end of the thread, and the joint between the bearing surface (6) and the head side of the unthreaded part (20) is positioned outside of the major diameter of the external thread from the center of the screw (1). The diameter of this unthreaded part of the shank is made larger enough than the external diameter of the thread to form a designated thickness between the external surface of the unthreaded part (20) and the external wall (11) of the recess (10). The gradient α of the circumference of this unthreaded part (20) of the shank is made larger than the gradient β of the external wall (11) of the recess (10), ensuring the flowability of material at time of heading. On the other hand, radius (21) with a curved surface at a sectional view is formed at the lower end of the unthreaded part (20) of the shank in such a way as to be directly connected to the thread portion (3), largely preventing stress concentration at this part from occurring at time of fastening the screw (1).

As shown in FIG. 2, the shank (4) with a thread portion (3) formed along the shank (4) from the lower end of the unthreaded part (20) of the shank down to the lower end of the shank (4) forms a quasi-triangle at a cross-sectional view. In this embodiment, a quasi-triangular form of thread portion is applied, by which to obtain a smooth driving-in while forming an internal thread (31) into the tapped hole (not drawn) of a work piece (30). A circular form of screw ridge can also be applied.

Figure 3:
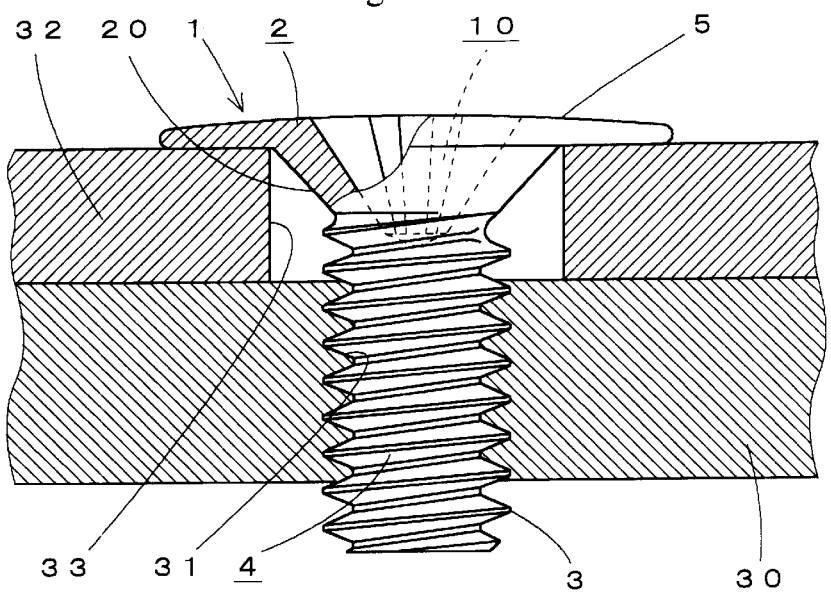
FIG. 3 is a Front Sectional View of the Main Part for Describing the Status of Use of the Invention.

In this work piece of driving in this screw (1) with a thin head into the work piece (30), as shown in FIG. 3, torsional strength from the screw driver is transmitted to the screw (1) by making the screw driver and the recess (10) of the screw (1) meet.

Figure 4:
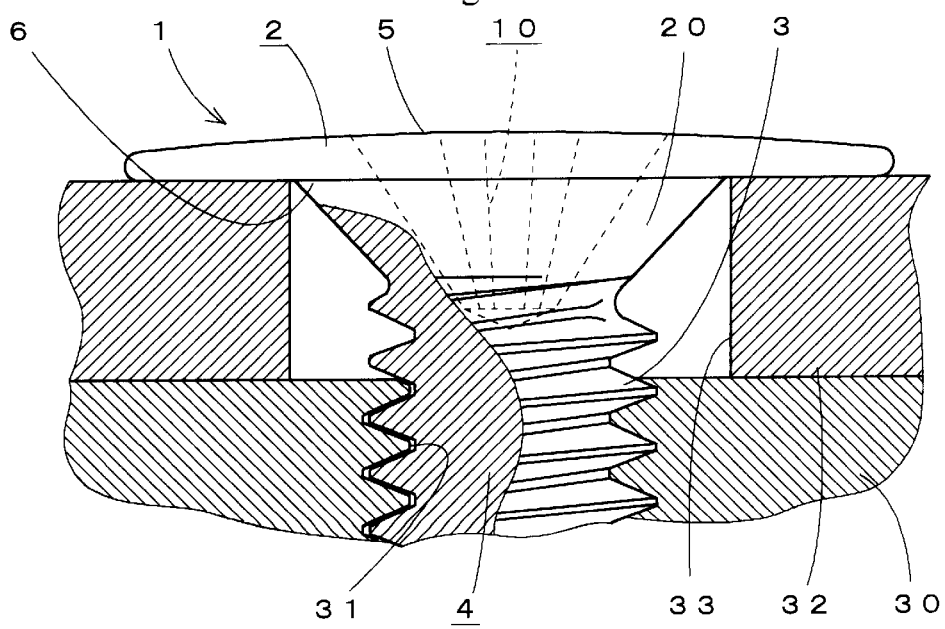
FIG. 4 is a Enlarged Sectional View of the Main Part in FIG. 3.

And after rightly placing a fastened member (32) on the tapped hole, as shown in FIG. 4, the screw is driven into the tapped hole, while the three vertexes of the quasi-triangular form of thread portion (3) of the shank (4) creating an internal thread into the work piece (30).

Figure 5:
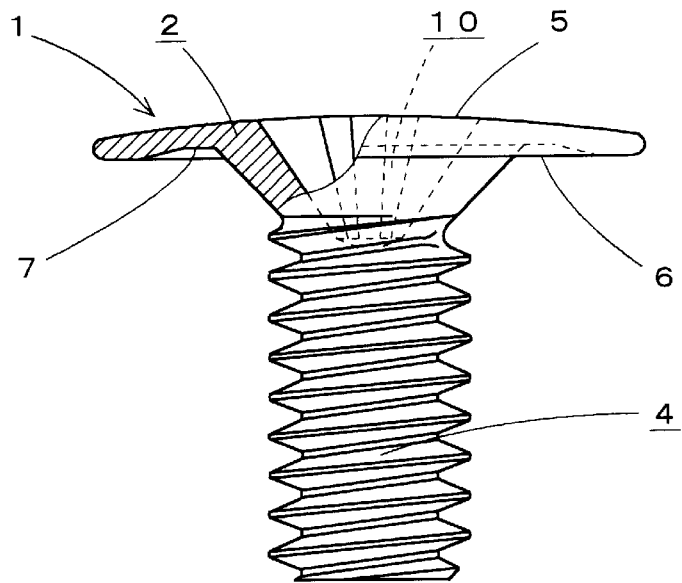
FIG. 5 shows a Sectional View of the Main Part for Describing Another Embodiment of the Invention.
Figure 6:
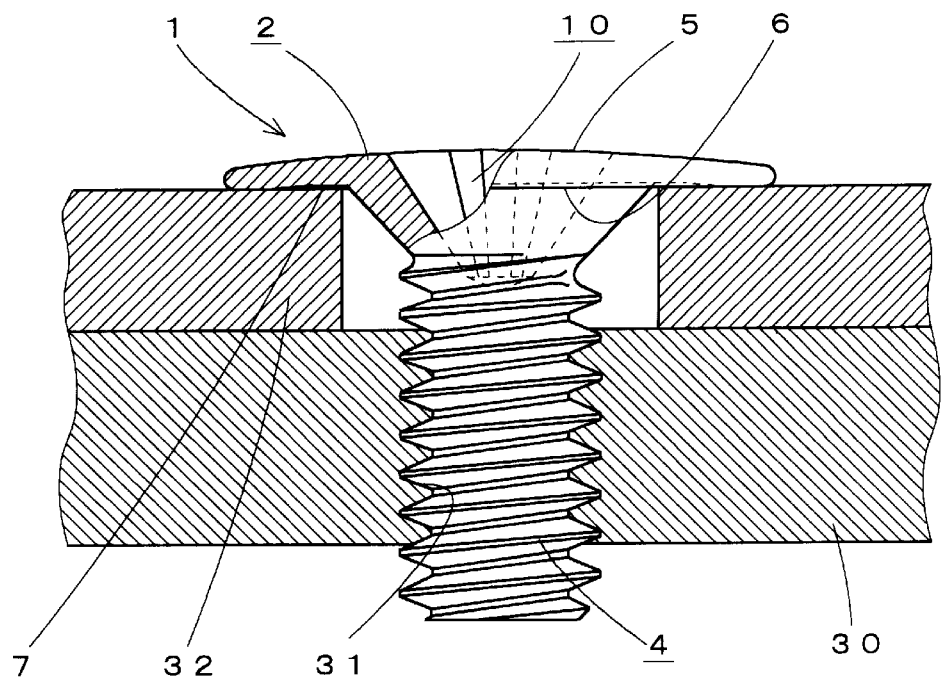
FIG. 6 shows a Sectional View of the Main Part for Describing the Status of Use of Another Embodiment of the Invention.
Figure 7:
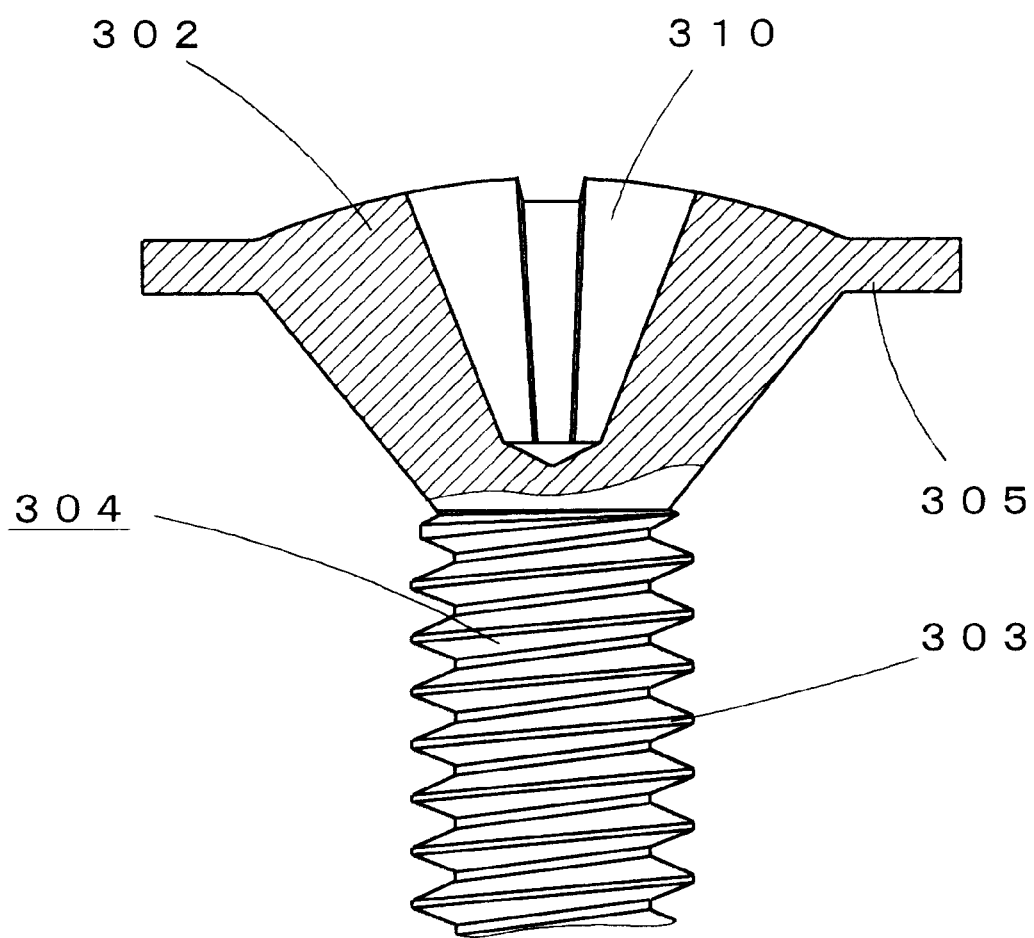
FIG. 7 shows a Sectional View of the Main Part of another embodiment related to the Invention.

The screw (1) shown in FIG. 5, which possesses curved part (7) at a sectional view from the center of the head (2) to the circumference of the head (2), is designed to have a spring effect at the bearing surface (6) of the head (2), the mechanism of which is to create a spring effect with the screw arising out of its warpedness obtained by pressingly fastening the fastened member to the work piece (30), thereby preventing loosening strength from occurring between the screw (1) and the work piece (30).

As clearly shown in the present embodiment of an example, the invention is a screw (1) with a thin head comprising: a screw head (2) with a recess (10); and a shank (4) with thread portion (3) formed on it, which has the top of the screw head (5) forming a circular arc of a comparatively large radius and has an unthreaded part (20) tapered down with larger diameter at the bottom of the head and smaller diameter at the upper end of the thread (3) between the bearing surface (6) of the screw head (2) and the thread (3) of the shank (4) and has radius (21) with a curved surface at a sectional view formed at the lower end of the unthreaded part (20) of the shank in such a way as to be directly connected to the thread portion (3), and therefore it will be readily and exactly produced to be used for compact products and correspond with compact and thin products of the future. And the radius (21) with a curved surface at a sectional view is connected to the unthreaded part (20) of the shank on one hand and to the screw ridge (3) on the other, preventing stress concentration at this part from occurring at time of fastening and a long time after the fastening of the screw (1), so ensuring a fastening strength, without causing a fatigue fracture. And further, when heat and plating treatments have been applied to the screw for it to attain necessary strength, as the top of the screw head is not flat, there is no possibility of the heads of the screws being stacked to each other in the course of mass production, ensuring stable heat and plating treatments.

As the screw has a thin head which features the gradient α of the circumference of the unthreaded part being larger than the gradient β of the external wall (11) of the recess (10) formed on the head (2) of the screw (1), the smooth flowability of material will be attained at time of heading, enabling the life-spans of a punch and a holder to be lengthened and the defective heading of heads to be reduced in number, strengthening the neck of the screw. And, the shank (4) on which a thread portion (3) is designed, forming a quasi-triangular form at a cross-sectional view, to obtain a smooth driving-in while forming an internal thread (31) into the tapped hole of a work piece (30) by its three vertexes with a comparatively low tightening torque.

Furthermore, as the screw head (2) has a bend (7) of a curvature form at a sectional view formed on the bearing surface between the center of the head (2) and the outer circumference of the head (2), a spring effect will be obtained with the head at time of fastening, preventing the screw from loosening due to vibrations. And as the screw head has a bend formed, it is tightly retained with its increased fastening strength. On the other hand, as the screw head is a thin head with the outer diameter of the head being approximately 2.5 to 3 times larger than the major diameter of the external thread, the area where the head and the fastened member meet will be enlarged, ensuring a retaining power, which is a characteristic advantage.

Although the present invention has been fully described by way of example with reference to the accompanying drawings, it is to be noted that various changes and modifications will be apparent to those skilled in the art.

Therefore, unless otherwise such changes and modifications depart from the scope of the present invention, they should as being included therein.

What is claimed is:

1. A screw with a thin head comprising a screw head (2) in which a recess (10) coinciding with a driver bit that transfers driving force is formed and a shank (4) which is integrated with and a thread portion (3) is formed on, featuring a circular arc of a comparatively large radius formed on the head top (5); an unthreaded part (20) with larger diameter at a bottom of the head and smaller diameter at an upper end of the thread; which is tapered down between a bearing surface (6) and the threaded portion (3) of the shank (4); a radius (21) with a curved surface at a sectional view along almost one pitch of thread, which is formed at an end of the unthreaded part (20) of the shank in such a way as to be directly connected to the thread portion (3) preventing stress concentration from occurring herein at and after the fastening of the screw.

* * * * *